(12) United States Patent
Higashimori

(10) Patent No.: US 10,450,887 B2
(45) Date of Patent: Oct. 22, 2019

(54) ON-OFF VALVE DEVICE AND ROTARY MACHINE

(71) Applicant: MITSUBISHI HEAVY INDUSTRIES ENGINE & TURBOCHARGER, LTD., Kanagawa (JP)

(72) Inventor: Hirotaka Higashimori, Nagasaki (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 259 days.

(21) Appl. No.: 15/329,640

(22) PCT Filed: Aug. 27, 2014

(86) PCT No.: PCT/JP2014/072460
§ 371 (c)(1),
(2) Date: Jan. 27, 2017

(87) PCT Pub. No.: WO2016/030997
PCT Pub. Date: Mar. 3, 2016

(65) Prior Publication Data
US 2017/0218836 A1    Aug. 3, 2017

(51) Int. Cl.
*F01D 17/14*    (2006.01)
*F01D 17/18*    (2006.01)
(Continued)

(52) U.S. Cl.
CPC .............. *F01D 17/145* (2013.01); *F01D 5/04* (2013.01); *F01D 5/12* (2013.01); *F01D 9/026* (2013.01);
(Continued)

(58) Field of Classification Search
CPC ...... F01D 17/145; F01D 17/105; F01D 17/14; F01D 17/146; F01D 17/148; F01D 17/18;
(Continued)

(56) References Cited

U.S. PATENT DOCUMENTS 4,565,068 A * 1/1986 Schneider ............. F01D 17/146
                                                      415/205
4,579,506 A * 4/1986 Ossberger ................ F03B 3/00
                                                      415/151
(Continued)

FOREIGN PATENT DOCUMENTS

DE        4210048 A1     9/1993
DE      29502676 U1     3/1995
(Continued)

OTHER PUBLICATIONS

International Search Report and Written Opinion of the International Searching Authority (Forms PCT/ISA/237 and PCT/ISA/210), dated Mar. 17, 2015, for International Application No. PCT/JP2015/055095 with an English translation.
(Continued)

*Primary Examiner* — Mahmoud Gimie
(74) *Attorney, Agent, or Firm* — Birch Stewart Kolasch & Birch LLP

(57) ABSTRACT

A turbocharger is provided with a valve body which is disposed in a suction flow path leading from an inflow port of a housing covering a turbine rotor blade to a scroll portion and composed of a single piece or multiple divided pieces to supply a fluid to the turbine rotor blade with the inner surface thereof formed using a first wall surface and a second wall surface facing the first wall surface as part thereof, extends from the upstream side to the downstream side of the flow of the fluid, is rotatably provided in the housing in a direction toward and away from the first wall surface and the second wall surface, forms an upstream-side narrowed flow path with the first wall surface therebetween at an end on the upstream side, and forms a downstream-side narrowed flow path with the second wall surface therebetween at an end on the downstream side. The valve body has a first surface at the end on the upstream side, which faces
(Continued)

the first wall surface, gradually approaches the first wall surface from the upstream side to the downstream side and thereafter gradually goes away therefrom, and a second surface which faces the second wall surface.

18 Claims, 12 Drawing Sheets

(51) Int. Cl.
*F01D 5/04* (2006.01)
*F01D 25/24* (2006.01)
*F01D 9/02* (2006.01)
*F02B 37/22* (2006.01)
*F01D 17/10* (2006.01)
*F02B 37/02* (2006.01)
*F01D 5/12* (2006.01)
*F01D 5/14* (2006.01)

(52) U.S. Cl.
CPC ........... *F01D 17/105* (2013.01); *F01D 17/14* (2013.01); *F01D 17/146* (2013.01); *F01D 17/148* (2013.01); *F01D 17/18* (2013.01); *F01D 25/24* (2013.01); *F02B 37/025* (2013.01); *F02B 37/22* (2013.01); *F01D 5/145* (2013.01); *F05D 2220/40* (2013.01); *F05D 2240/60* (2013.01); *F05D 2250/15* (2013.01); *Y02T 10/144* (2013.01)

(58) Field of Classification Search
CPC ... F01D 5/04; F01D 5/12; F01D 5/145; F01D 9/026; F01D 25/24; F01D 37/025; F01D 37/22; F05D 2220/40; F05D 2240/60; F05D 2250/15
USPC ........................................................ 415/151
See application file for complete search history.

(56) References Cited

U.S. PATENT DOCUMENTS

| | | |
|---|---|---|
| 7,428,814 B2 | 9/2008 | Pedersen et al. |
| 2005/0260067 A1 | 11/2005 | Parker et al. |
| 2009/0290980 A1 | 11/2009 | Higashimori |
| 2010/0074743 A1 | 3/2010 | Jairazbhoy et al. |
| 2012/0014788 A1 | 1/2012 | Blair et al. |
| 2012/0294711 A1 | 11/2012 | Grigoriev et al. |
| 2013/0149129 A1 | 6/2013 | Matsuyama et al. |
| 2013/0177403 A1 | 7/2013 | Oimstead |
| 2014/0341729 A1 | 11/2014 | Osako et al. |

FOREIGN PATENT DOCUMENTS

| | | | |
|---|---|---|---|
| DE | 10041806 A1 | 3/2001 | |
| DE | 102007025437 A1 | 12/2008 | |
| DE | 102009020591 A1 | 11/2010 | |
| DE | 102012110634 A1 | 5/2014 | |
| EP | 0208248 A1 * | 1/1987 | ............. F01D 17/18 |
| EP | 2402578 A1 | 1/2012 | |
| JP | 54-47916 A | 4/1979 | |
| JP | 60-19918 A | 2/1985 | |
| JP | 62-193137 U | 12/1987 | |
| JP | 63-48928 U | 4/1988 | |
| JP | 63-306233 A | 12/1988 | |
| JP | 1-21145 Y2 | 6/1989 | |
| JP | 1-277627 A | 11/1989 | |
| JP | 7-279680 A | 10/1995 | |
| JP | 2000-110572 A | 4/2000 | |
| JP | 3725287 B2 | 12/2005 | |
| JP | 2007-23893 A | 2/2007 | |
| JP | 2007-23894 A | 2/2007 | |
| JP | 2007-192128 A | 8/2007 | |
| JP | 2007-309140 A | 11/2007 | |
| JP | 2008-503685 A | 2/2008 | |
| JP | 2009-47163 A | 3/2009 | |
| JP | 2012-102745 A | 5/2012 | |
| WO | WO 2014/099329 A1 | 6/2014 | |

OTHER PUBLICATIONS

International Search Report and Written Opinion of the International Searching Authority (Forms PCT/ISA/237 and PCT/ISA/210), dated Nov. 25, 2014, for International Application No. PCT/JP2014/072460 with an English translation.

* cited by examiner

ON-OFF VALVE DEVICE AND ROTARY MACHINE

TECHNICAL FIELD

The present invention relates to an on-off valve device which is provided in a rotary machine and regulates a flow rate of a working fluid, and a rotary machine including the on-off valve.

BACKGROUND ART

For example, a rotary machine capable of extracting mechanical energy from kinetic energy of a fluid is known.

As the rotary machine, a turbocharger, an expander, a gas turbine, or the like is known, and a radial turbine, a mixed flow turbine, or the like is provided in these.

In general, as the turbocharger, a variable capacity turbine is used, which has a function which regulates a flow rate of an exhaust gas serving as a working fluid according to a change of output of an engine.

In addition, in a case where an expander is used in an apparatus which converts exhaust energy into electric energy, it is necessary to change output while maintaining a constant rotating speed in order to maintain a constant generation frequency. The expander has the above-described variable capacity function in order to cope with the above-described circumstances.

In addition, since a gas turbine used in a jet engine or the like is provided to accelerate or decelerate an aircraft, the gas turbine also has the variable capacity function.

Meanwhile, in order to realize the variable capacity function of the turbocharger, currently, various technologies are known. For example, there is a technology (for example, PTL 1) which changes a throat area by regulating an attachment angle of a nozzle, a technology which uses a flow regulating valve or a bypass valve, or the like.

Here, FIG. 11 shows a turbine having a variable capacity function which uses a nozzle in the related art. In order to exert the variable capacity function, a turbine 100 includes an on-off valve 101 which is provided on an upstream end of a division wall 102 of a a scroll flow path C0 and regulates a flow rate of a working fluid F0 flowing in a turbine rotor blade 103 by rotating the on-off valve 101 with the upstream end as a supporting point.

CITATION LIST

Patent Literature

[PTL 1] Japanese Unexamined Patent Application Publication No. 2012-102745

SUMMARY OF INVENTION

Technical Problem

However, in the configuration shown in FIG. 11 which is the above-described related art, if the angle of the on-off valve 101 in the flow direction of the working fluid F0 increases, the working fluid F0 is separated on the downstream side due to diffuser effects, a backward flow is generated (refer to a speed distribution shown by a broken line Y in FIG. 11). Accordingly, a pressure loss increases, and operation efficiency of the turbine 100 is likely to decrease.

Particularly, since the on-off valve is exposed to a high-temperature gas of approximately 1000° C. in a turbocharger or a small-sized gas turbine, it is necessary to avoid occurrence of thermal stress, thermal deformation, wear, or the like in a drive mechanism of the on-off valve. Accordingly, it is necessary to provide a mechanism for protecting the drive mechanism or secure a clearance between the on-off valve and a housing. In addition, operation efficiency is likely to decrease due to a flow leaking from the protection mechanism or the clearance.

The present invention provides an on-off valve device capable of improving operation efficiency by a simple structure and a rotary machine including the on-off valve device.

Solution to Problem

According to a first aspect of the present invention, there is provided an on-off valve device including: a valve body which is disposed in a suction flow path which leads from an inflow port of a housing covering a turbine rotor blade to a scroll portion and is configured of a single piece or multiple divided pieces to supply a fluid to the turbine rotor blade with an inner surface of the suction flow path formed using a first wall surface and a second wall surface facing the first wall surface as a portion of the suction flow path, extends from the upstream side toward the downstream side of the flow of the fluid, is rotatably provided in the housing in a direction toward and away from the first wall surface and the second wall surface, forms an upstream-side narrowed flow path between the first wall surface and the valve body at an end on the upstream side, and forms a downstream-side narrowed flow path between the second wall surface and the valve body at an end on the downstream side. In the valve body, the end on the upstream side is an end facing the first wall surface, and the end on the upstream side is formed of a first surface which gradually goes away from the first wall surface after gradually approaches the first wall surface from the upstream side toward the downstream side, and the valve body includes a second surface which faces the second wall surface at the end on the downstream side.

According to the on-off valve device, it is possible to regulate a gap between the valve body and the first wall surface of the housing, that is, the flow path width of the upstream-side narrowed flow path by rotating the valve body, and it is possible to change the flow rate of the fluid flowing into the turbine rotor blade.

In addition, in the upstream-side narrowed flow path, the flow path width gradually decreases according to the shape of the first surface of the valve body, and thereafter, the flow path width gradually increases. Accordingly, the pressure of the fluid is recovered by diffuser effects while the fluid passing through the upstream-side narrowed flow path is prevented from being separated from the first surface.

In addition, the fluid passing through the downstream-side narrowed flow path is accelerated, a static pressure around the downstream-side narrowed flow path decreases. Therefore, the fluid which flows in the flow path between the first wall surface and the valve body is accelerated toward the static pressure decrease region which is formed by the downstream-side narrowed flow path. Accordingly, it is possible to prevent the fluid from being separated from the first surface. That is, since speeds of a fluid on the downstream side of the valve body are distributed so as to be uniformed, it is possible to decrease a pressure loss, and it is possible to prevent the entire pressure from decreasing.

In addition, in the on-off valve device according to a second aspect of the present invention, in the first aspect, an upstream-side opening which is open to the second surface, a downstream-side opening which is open to the first surface on the downstream side of the upstream-side opening, and a through hole portion which connects the upstream-side opening and the downstream-side opening to each other and penetrates a portion between the first surface and the second surface may be formed in the valve body.

In this way, since the through hole portion is formed in the valve body, a fluid flows from the upstream-side opening into the through hole portion and flows out from the downstream-side opening. As a result, since a flow velocity of the fluid around the outlet of the downstream-side opening increases and a static pressure decreases, it is possible to accelerate the fluid flowing along the first surface toward the downstream side. Accordingly, since speeds of the fluid on the downstream side of the valve body are distributed so as to be uniformed, it is possible to decrease a pressure loss, and it is possible to further prevent the entire pressure from decreasing.

Moreover, in the on-off valve device according to a third aspect of the present invention, in the first or the second aspect, the valve body may include a protrusion surface which gradually approaches the first wall surface toward the downstream side, a first recessed surface which is continued to the downstream side of the protrusion surface and is curved to be recessed toward the second surface, and a second recessed surface which is continued to the downstream side of the first recessed surface and is curved to be recessed toward the second surface with a curvature radius which is greater than that of the first recessed surface, as the first surface, and includes a protrusion surface which is cured to protrude toward the side going away from the first surface, as the second surface.

In this way, after the fluid passing through the upstream-side narrowed flow path flows along the protrusion surface, the fluid flows toward the downstream side along the first recessed surface and the second recessed surface. At this time, first, it is possible to cause the fluid to flow while increasing an increase rate of the flow path width between the first wall surface and the first recessed surface by the first recessed surface. Thereafter, it is possible to cause the fluid to flow while decreasing the increase rate of the flow path width by the second recessed surface. That is, by providing the second recessed surface having a greater curvature radius on the downstream side on which a flow velocity increases and boundary layer is easily generated, it is possible to effectively prevent the fluid from being separated from the first surface.

In addition, by providing the protrusion surface on the second wall surface side as the second surface, after a decrease rate of the flow path width between the second wall surface and the protrusion surface rapidly increases on the upstream side, the decrease rate of the flow path width gradually decreases. That is, the fluid flowing along the second surface is accelerated toward the downstream-side narrowed flow path, and the static pressure around the downstream-side narrowed flow path decreases. Accordingly, the fluid passing through the flow path between the first wall surface and the valve body is accelerated toward a static pressure decrease region which is formed by the downstream-side narrowed flow path, and it is possible to prevent the fluid from being separated from the first surface.

Therefore, it is possible to decrease a pressure loss, and it is possible to prevent it is possible to prevent the entire pressure from decreasing.

Moreover, in the on-off valve device according to a fourth aspect of the present invention, in any one of the first to third aspects, a rotary portion which rotates the valve body may be separately provided from the housing.

In this way, since the rotary portion is separately provided, it is possible to separately process the rotary portion using a process different from the process of manufacturing the housing, and it is possible to improve processing accuracy. Accordingly, it is possible to perform accurate processing by which a clearance between the first wall surface and the valve body and a clearance between the second wall surface and the valve body can be decreased as much as possible, and it is possible to prevent operation efficiency from decreasing due to a leakage flow from the clearances.

In addition, it is possible to easily improve processing accuracy of the attachment portion between the rotary portion and the valve body, it is possible to improve durability of the attachment portion, and it is possible to improve reliability of the on-off valve device.

In addition, in the on-off valve device according to a fifth aspect of the present invention, in any one of the first to fourth aspects, multiple valve bodies may be provided to be arranged in a row from the upstream side toward the downstream side, and rotary portions which individually rotate the valve bodies may be provided.

In this way, since the multiple valve bodies are provided and each valve body is rotated, it is possible to form the upstream-side narrowed flow path between the valve body positioned on the most upstream side and the first wall surface, and it is possible to form the downstream-side narrowed flow path between the valve body positioned on the most downstream side and the second wall surface. In addition, since each of the valve bodies is rotated, it is possible to arbitrarily change the flow path width of each of the upstream-side narrowed flow path and the downstream-side narrowed flow path. Moreover, since each of the valve bodies is rotated, it is possible to cause the fluid to flow from the upstream side toward the downstream side between the valve bodies. That is, the fluid flows between the valve bodies and flows to the first surface side of the valve body. As a result, a static pressure decreases at the position at which the fluid flows out. Accordingly, it is possible to accelerate the fluid flowing along the first surface toward the downstream side. Therefore, since speeds of the fluid on the downstream side of the valve body positioned on the downstream side are distributed so as to be uniformed, it is possible to decrease a pressure loss, and it is possible to prevent the entire pressure from decreasing.

In addition, by selecting a rotation angle of each valve body, the entirety of the multiple valve bodies arranged in a row has a shape protruding toward the second wall surface or has a shape protruding toward the first wall surface, and it is possible to select the valve body having an arbitrary shape. Accordingly, it possible to effectively prevent separation or the like by rotating each valve body according to the situation of the flow field of the fluid.

According to a sixth aspect of the present invention, there is provided a rotary machine, including: a rotary shaft which rotates about an axis; a turbine rotor blade which rotates along with the rotary shaft; a housing which covers the rotary shaft and the turbine rotor blade and in which a suction flow path through which a fluid is supplied to the turbine rotor blade is formed; and the on-off valve device according to any one of the first to fifth aspects which is provided in the suction flow path of the housing.

According to the rotary machine, since the on-off valve device is provided, in the upstream-side narrowed flow path, the flow path width gradually decreases according to the shape of the first surface of the valve body, and thereafter, the flow path width gradually increases. Accordingly, a pressure is recovered due to diffuser effects while the fluid passing through the upstream-side narrowed flow path is prevented from being separated from the first surface. In addition, if the fluid passes through the downstream-side narrowed flow path, since the fluid is accelerated, a static pressure around the downstream-side narrowed flow path decreases. Accordingly, the fluid passing through the flow path between the first wall surface and the valve body is accelerated toward the static pressure decrease region which is formed by the downstream-side narrowed flow path. Therefore, it is possible to prevent the fluid from being separated from the first surface, that is, speeds of a fluid on the downstream side of the valve body are distributed so as to be uniformed. As a result, it is possible to decrease a pressure loss, and it is possible to prevent the entire pressure from decreasing.

In addition, in the rotary machine according to a seventh aspect of the present invention, in the sixth aspect, in the housing, the second wall surface may be formed of a division wall surface which divides the scroll portion into two paths in the direction intersecting the flow direction of the fluid.

In this way, in the rotary machine in which the scroll portion is divided into two paths, since speeds of a fluid on the downstream side of the valve body are distributed so as to be uniformed, it is possible to decrease a pressure loss, and it is possible to prevent the entire pressure from decreasing.

Advantageous Effects of Invention

According to the on-off valve device and the rotary machine, since the valve body which forms the upstream-side narrowed flow path and the downstream-side narrowed flow path and has the first surface is provided, it is possible to improve operation efficiency by a simple structure.

DESCRIPTION OF EMBODIMENTS

[First Embodiment]

Hereinafter, a turbocharger 1 according to a first embodiment of the present invention will be described with reference the drawings.

Figure 1:
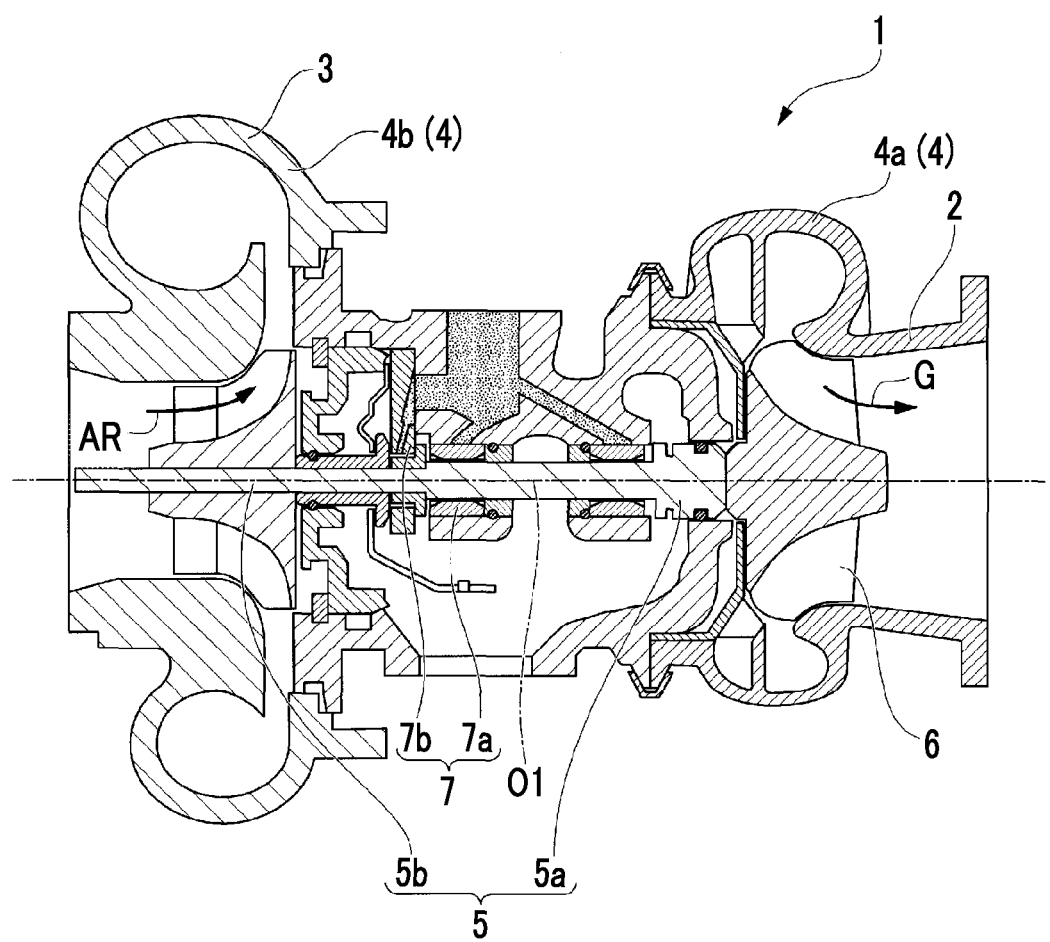
FIG. 1 is a vertical sectional view showing the entire turbocharger according to a first embodiment of the present invention.

As shown in FIG. 1, the turbocharger 1 (rotary machine) includes a rotary shaft 5 which rotates about an axis O1, a turbine 2 and a compressor 3 which rotates along with the rotary shaft 5, a housing 4 which covers the rotary shaft 5, and a bearing device 7 which is provided in the housing 4 and supports the rotary shaft 5.

The bearing device 7 includes a radial bearing 7a which receives a load of the rotary shaft 5 in a radial direction and a thrust bearing 7b which receives a load of the rotary shaft 5 in a thrust direction.

The turbocharger 1 rotates the turbine 2 by an exhaust gas G (fluid) from an engine (not shown), and supplies air AR which is compressed by the compressor 3 according to the rotation to the engine.

Figure 2:
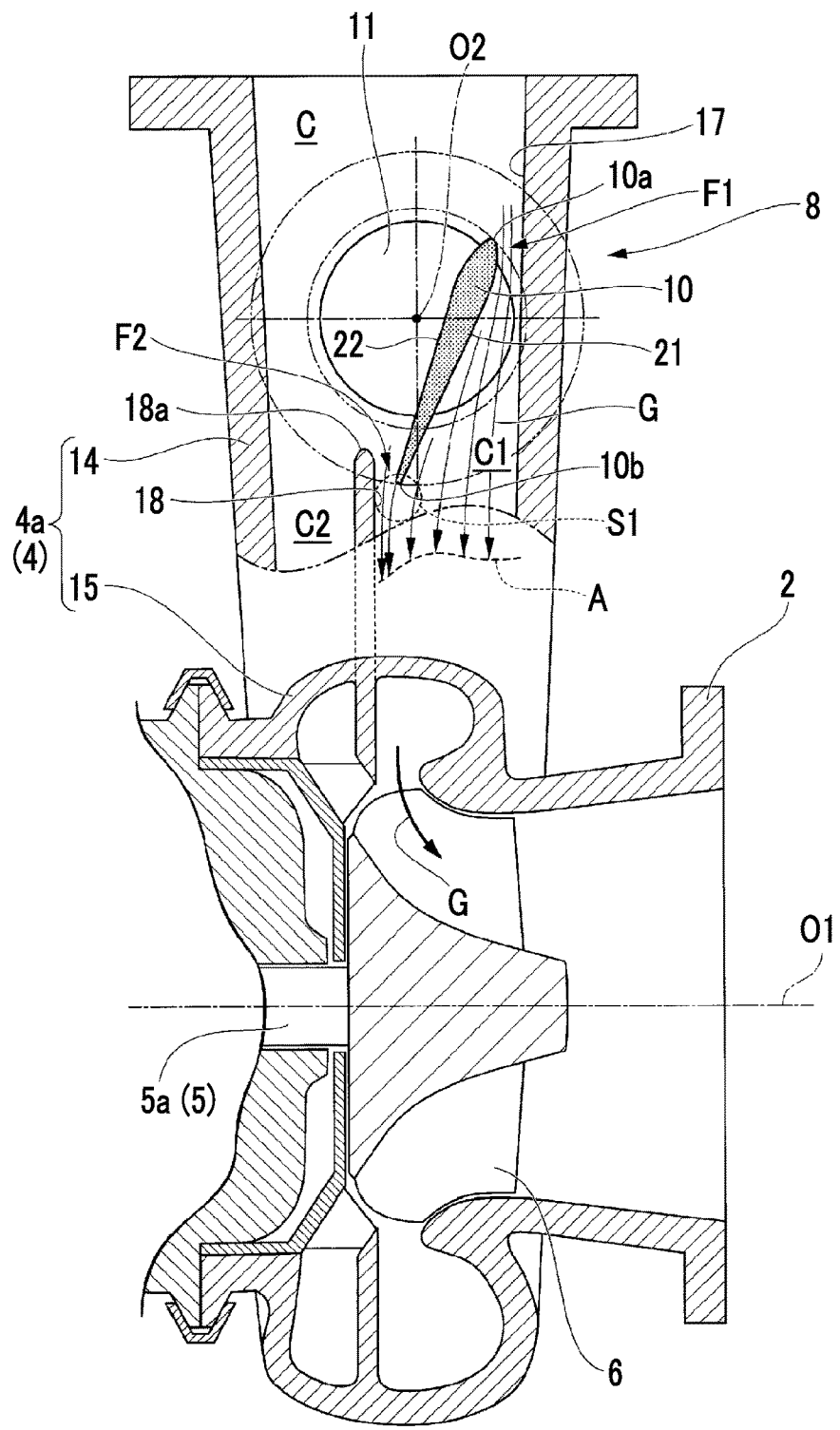
FIG. 2 is a vertical sectional view showing a main portion of the turbocharger according to the first embodiment of the present invention.

As shown in FIG. 2, the turbine 2 includes a turbine rotary shaft 5a, a turbine rotor blade 6 which is attached to the turbine rotary shaft 5a, a turbine housing 4a which covers the turbine rotor blade 6, and an on-off valve device 8 which is provided in the turbine housing 4a.

The turbine rotary shaft 5a is portion of the turbine 2 side in the rotary shaft 5. The turbine rotary shaft 5a is integrated with a compressor rotary shaft 5b of the compressor 3 side so as to configure the rotary shaft 5.

The turbine housing 4a is integrated with the compressor housing 4b covering the compressor 3 so as to configure the housing 4.

In addition, a scroll flow path C (suction flow path) through which the exhaust gas G flows into the turbine rotor blade 6 is formed in the turbine housing 4a.

The scroll flow path C is formed inside an inlet portion 14 (inflow port) which is provided in the turbine housing 4a and extends and is open toward the outside in the radial direction of the axis O1, and is formed inside a scroll portion 15 which is provided in the turbine housing 4a so as to be continuous to the inlet portion 14 and spirally extends toward the turbine rotor blade 6 in the circumferential direction.

In the inlet portion 14, a wall surface 17 (first wall surface) which forms the inner surface of the scroll flow path C, and a division wall surface 18 (second wall surface) which is disposed to face the wall surface 17 in the direction of the axis O1 and extends from the inlet with respect to the turbine rotor blade 6 toward the outside in the radial direction. Accordingly, the scroll flow path C is divided into two in the direction of the axis O1. That is, the turbocharger 1 of the present embodiment is a so-called twin scroll turbo.

Hereinafter, the portion of the turbine rotor blade 6 side in the scroll flow path C in the state where the division wall surface 18 is interposed is referred to as a first flow path C1, and the portion of the compressor 3 side is referred to as a second flow path C2.

The on-off valve device 8 includes a valve body 10 which is provided in the turbine housing 4a over the portion between the wall surface 17 and the division wall surface 18, and a rotary portion 11 which attaches the valve body 10 to the turbine housing 4a.

The valve body 10 is a member which extends from the upstream side in the flow of the exhaust gas G toward the downstream side, that is, extends in the radial direction of the rotary shaft 5. The valve body 10 includes a first surface 21 which faces the wall surface 17 side of the turbine housing 4a and a second surface 22 which faces the division wall surface 18 side, and is formed in a blade shape when viewed in the circumferential direction of the rotary shaft 5.

The valve body 10 is provided to form an upstream-side narrowed flow path F1 between the wall surface 17 and the valve body 10 on an end on the upstream side (an end (front edge portion 10a) on the outside in the radial direction) and to form a downstream-side narrowed flow path F2 between the division wall surface 18 and the valve body 10 on an end on the downstream side (in the inside in the radial direction (rear edge portion 10b)). Each of the upstream-side narrowed flow path F1 and the downstream-side narrowed flow path F2 is a throttle portion in which a width of a flow path of the exhaust gas G decreases.

In addition, the end on the downstream side of the valve body 10 extends to a position at which the end overlaps a tip portion 18a of the division wall surface 18 in the radial direction of the rotary shaft 5. In other words, a distance between the end on the downstream side of the valve body 10 and the axis O1 of the rotary shaft 5 is shorter than a distance between the tip portion 18a and the axis O1 of the rotary shaft 5.

After the first surface 21 of the valve body 10 is smoothly curved toward the rear edge portion 10b side to gradually approach the wall surface 17 on the front edge portion 10a which becomes the position of the end on the upstream side, the first surface 21 is linearly formed so as to gradually go away from the wall surface 17 toward the downstream side. That is, the first surface 21 has a protrusion shape toward the wall surface 17 side in the direction of the axis O1.

The second surface 22 of the valve body 10 has the shape similar to that of the first surface 21. That is, the second surface 22 has a protrusion shape toward the division wall surface 17 side and is formed to linearly extend to the rear edge portion 10b side.

That is, after the first surface 21 and the second surface 22 go away from each other toward the rear edge portion 10b side, the first surface 21 and the second surface 22 approach each other. Accordingly, after the thickness of the valve body 10 in the direction of the axis O1 gradually increases from the front edge portion 10a toward the rear edge portion 10b side, the thickness of the valve body 10 gradually decreases, the thickness of the rear edge portion 10b is smaller than the thickness of the front edge portion 10a, and the valve body 10 has a tapered shape.

The valve body 10 provided on the turbine housing 4a at the inlet portion 14 is attached to the rotary portion 11. As shown in FIG. 2, the rotary portion 11 can rotate the valve body 10 in a direction toward and away from the wall surface 17 and the division wall surface 18, that is, can rotate the valve body 10 about an axis O2 extending in the circumferential direction of the rotary shaft 5. The rotary portion 11 rotates the valve body 10 at a predetermined angle by a controller (not shown).

In addition, in the rotary portion 11, the axis O2 which becomes the rotation center of the valve body 10 is positioned outside the valve body 10. That is, the rotation center of the valve body 10 is disposed to go away from the valve body 10 on the compressor 3 side in the direction of the axis O1 of the rotary shaft 5.

Next, the operation of the valve body 10 will be described with reference to FIGS. 3A to 3C.

Figure 3A:
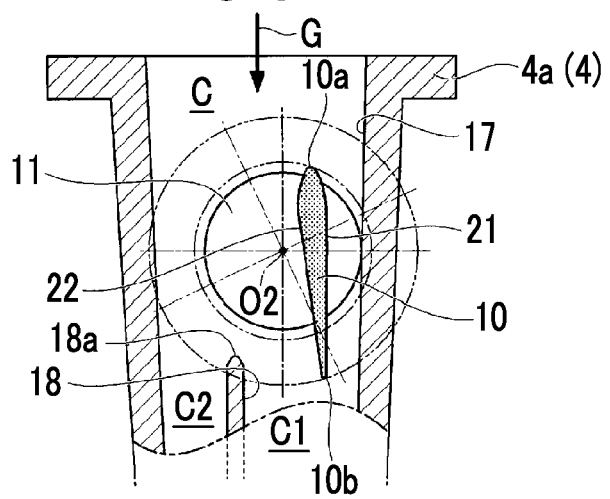
FIG. 3A is a vertical sectional view showing a main portion of the turbocharger according to the first embodiment of the present invention, and shows an on-off valve device when the valve device is fully opened.

Specifically, as shown in FIG. 3A, when the valve body 10 is fully opened, the front edge portion 10a of the valve body 10 goes away from the wall surface 17 and the first surface 21 is disposed along the wall surface 17. In addition, the rear edge portion 10b goes away from the division wall surface 18 and the second surface 22 is disposed along the division wall surface 18.

In the present embodiment, the valve body 10 is fully opened when the first surface 21 is approximately parallel to the wall surface 17, the flow rate of the exhaust gas G flowing into the turbine rotor blade 6 through the first flow path C1 becomes the maximum.

Figure 3B:
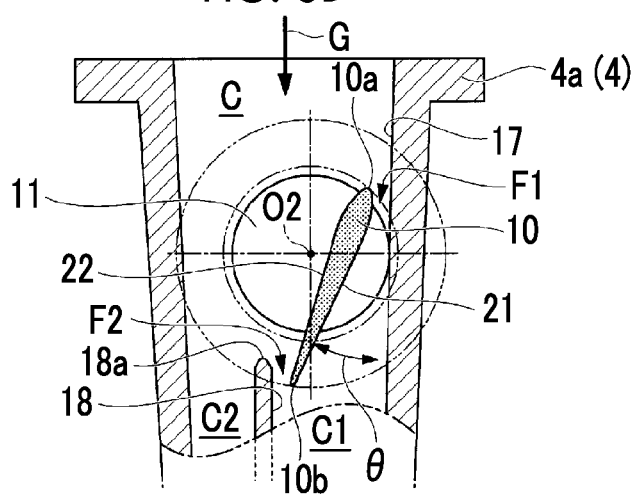
FIG. 3B is a vertical sectional view showing a main portion of the turbocharger according to the first embodiment of the present invention, and shows the on-off valve device having an intermediate opening degree.

In addition, as shown in FIG. 3B, in a case where the valve body 10 has an intermediate opening degree, the opening degree of the valve body 10 becomes an opening degree θ (an inclination angle of the rear edge portion 10b of the valve body 10 in a direction from the wall surface 17 toward the division wall surface 18) from the state where the valve body 10 is fully opened, the front edge portion 10a of the valve body 10 approaches the wall surface 17 and the rear edge portion 10b approaches the division wall surface 18. At this time, a gap is formed between the front edge portion 10a of the valve body 10 and the wall surface 17, and this gap becomes the upstream-side narrowed flow path F1. In addition, a gap is also formed between the rear edge portion 10b and the division wall surface 18 and this becomes the downstream-side narrowed flow path F2.

Figure 3C:
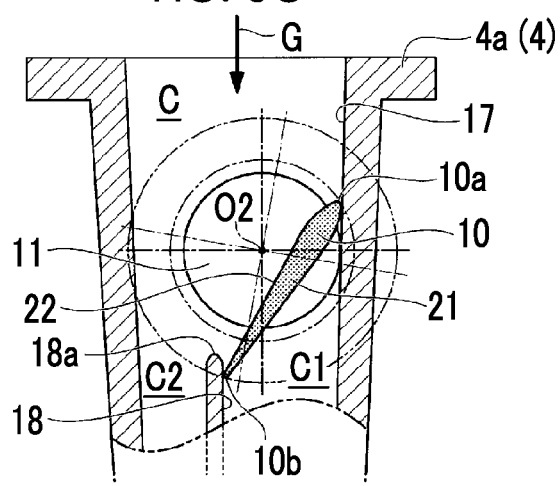
FIG. 3C is a vertical sectional view showing a main portion of the turbocharger according to the first embodiment of the present invention, and shows the on-off valve device when the valve device is fully closed.

In addition, as shown in FIG. 3C, when the valve body 10 is fully closed, the front edge portion 10a of the valve body 10 comes into contact with the wall surface 17, the rear edge portion 10b comes into contact with the tip portion of the division wall surface 18, and the first flow path C1 is closed.

Here, in actual, the case where the valve body 10 is fully closed does not include only the state where the valve body 10 completely comes into contact with the wall surface 17 and the division wall surface 18, and also includes a case where a slight gap is formed between the valve body 10, and the wall surface 17 and the division wall surface 18.

Meanwhile, it is possible to decrease a chord length (a length dimension from the front edge portion 10a to the rear edge portion 10b) of the valve body 10 by increasing the opening degree θ. In this case, a surface area of the valve body 10 which is exposed to the high temperature exhaust gas G decreases. Accordingly, preferably, the opening degree θ is 10° or more. In addition, more preferably, the opening degree θ is set to a range from 15° to 45°.

According to the turbocharger 1, by rotating the valve body 10 using the rotary portion 11, it is possible to regulate the flow path width of the upstream-side narrowed flow path F1, and it is possible to change the flow rate of the exhaust gas G flowing into the turbine rotor blade 6 through the first flow path C1.

In addition, in the case where the valve body 10 has the intermediate opening degree, in the shape of the upstream-side narrowed flow path F1, the flow path width gradually decreases according to the shape of the first surface 21 of the valve body 10, and thereafter, the flow path width gradually increases. Accordingly, a pressure is recovered due to diffuser effects while the exhaust gas G passing through the upstream-side narrowed flow path F1 is prevented from being separated from the first surface 21.

In addition, if the exhaust gas G passes through the downstream-side narrowed flow path F2, since the exhaust gas G is accelerated, a static pressure around the downstream-side narrowed flow path F2 decreases. Accordingly, the exhaust gas G flowing between the first surface 21 and the wall surface 17 in the valve body 10 is accelerated toward the static pressure decrease region S1 (refer to FIG. 2) which is formed by the downstream-side narrowed flow path F2.

Accordingly, it is possible to prevent the exhaust gas G from being separated from the first surface 21. That is, as shown by a broken line A in FIG. 2, since speeds of a fluid on the downstream side of the valve body 10 are distributed so as to be uniformed, it is possible to decrease a pressure loss, and it is possible to prevent the entire pressure in the first flow path C1 from decreasing.

According to the turbocharger 1 of the present embodiment, since the upstream-side narrowed flow path F1 and the downstream-side narrowed flow path F2 are formed and the valve body 10 having a blade shape is provided, it is possible to improve operation efficiency by a simple structure.

Here, in the present embodiment, the valve body 10 has a blade-shaped cross section. However, for example, the valve body 10 may have an elliptical cross section or a diamond-shaped cross section having the front edge portion and the rear edge portion with apexes. That is, any shape may be adopted as long as it gradually approaches the first surface from the front edge portion toward the rear edge portion side, and thereafter, it goes away from the first surface. Accordingly, the second surface may not necessarily have the shape which protrudes toward the division wall surface 18 side. For example, the second surface may be linearly formed when viewed in the circumferential direction.

[Second Embodiment]

Next, a turbocharger 31 according to a second embodiment of the present invention will be described with reference to FIG. 4.

In addition, the same reference numerals are assigned to the same components similar to those of the first embodiment, and detailed descriptions thereof are omitted.

In the present embodiment, a valve body 32 of an on-off valve device 30 is different from that of the first embodiment.

Similarly to the first embodiment, the valve body 32 has a blade-shaped cross section. In addition, in the valve body 32, an upstream-side opening 36 which is open to a second surface 34, a downstream-side opening 37 which is open to a first surface 33, and a through hole portion which connects the upstream-side opening 36 and the downstream-side opening 37 to each other and penetrates the valve body 32 are formed.

The upstream-side opening 36 is open to the second surface 34 so as to be spread such that the axis O2 which is the rotation center of the valve body 32 is interposed between both sides on the inside and the outside in the radial direction of the rotary shaft 5.

The downstream-side opening 37 is open to the first surface 33 at a position closer to the inside in the radial direction of the rotary shaft 5 than the axis O2. An opening area of the downstream-side opening 37 is smaller than an opening area of the upstream-side opening 36.

That is, with respect to a straight line which connects a front edge portion 32a and a rear edge portion 32b of the valve body 32 to each other, the upstream-side opening 36 is open to the second surface 34 so as to further approach the front edge portion 32a than the downstream-side opening 37, and the downstream-side opening 37 is open to the first surface 33 so as to approach the rear edge portion 32b.

A hole diameter of the through hole portion 38 gradually decreases from the upstream-side opening 36. In addition, in the inner surface of the through hole portion 38, an inner surface 38a positioned on the rear edge portion 32b side of the valve body 32 is smoothly curved in an arc shape so as to protrude toward the front edge portion 32a side and is connected to the downstream-side opening 37. In other words, the through hole portion 38 is formed in a bell-mouth shape in which the diameter of the through hole portion 38 increases toward the outside of the valve body 32 on the upstream-side opening 36 side.

Since the through hole portion 38 is formed in the valve body 32, the exhaust gas G flows from the upstream-side opening 36 into the through hole portion 38 and flows out from the downstream-side opening 37. At this time, sine the flow velocity of the exhaust gas G increases in the vicinity of the outlet of the downstream-side opening and a static pressure decreases, it is possible to accelerate the exhaust gas G flowing along the first surface 33 toward the downstream side.

Figure 4:
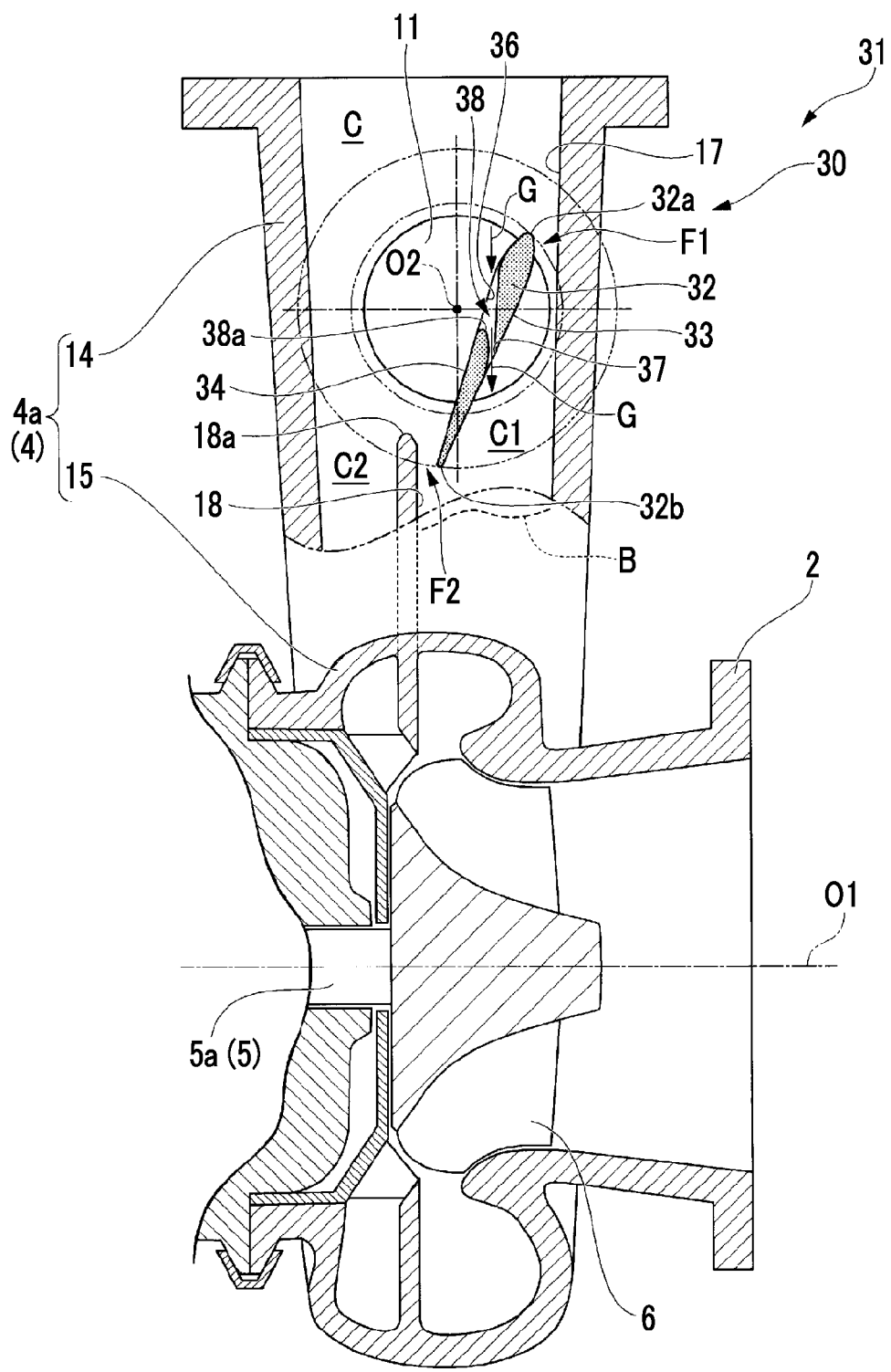
FIG. 4 is a vertical sectional view showing a main portion of a turbocharger according to a second embodiment of the present invention.

As a result, as shown by a broken line B in FIG. 4, since speeds of the exhaust gas G on the downstream side of the valve body 32 are distributed so as to be uniformed, it is possible to decrease a pressure loss, and it is possible to further prevent the entire pressure from decreasing. Accordingly, in the turbocharger 31 of the present embodiment, it is possible to further improve operation efficiency.

Here, multiple through hole portions 38 or only one through hole portion 38 may be formed so as to go away in the direction of the axis O2 which becomes the rotation center of the valve body 32. Similarly, multiple through hole portions 38 may be formed in the extension direction (the direction from the front edge portion 32a toward the rear edge portion 32b) of the valve body 32.

In addition, the shape of the through hole portion 38 is not necessarily limited to the case of the present embodiment. The upstream-side opening 36 side may not be formed of a bell-mouth shape. For example, the through hole portion 38 may be a simple hole portion in which the sectional area thereof is uniform from the upstream-side opening 36 to the downstream-side opening 37. In addition, the hole portion may have a circular cross section or a rectangular cross section.

[Third Embodiment]

Next, a turbocharger 41 according to a third embodiment of the present invention will be described with reference to FIG. 5.

In addition, the same reference numerals are assigned to the components similar to those of the first embodiment and the second embodiment, and detailed descriptions thereof are omitted.

In the present embodiment, a valve body 42 of an on-off valve device 40 is different from those of the first embodiment and the second embodiment.

The valve body 42 includes a protrusion surface 43a, a first recessed surface 43b, and a second recessed surface 43c which are continuous from the front edge portion 42a to the rear edge portion 42b, as the first surface 43. In addition, the valve body 42 includes a protrusion surface 44a as the second surface 44.

The protrusion surface 43a of the first surface 43 is formed on the front edge portion 42a of the valve body 42, and approaches the wall surface 17 while being curved toward the rear edge portion 42b side.

The first recessed surface 43b is smoothly continued to the protrusion surface 43a toward the rear edge portion 42b side and is curved to be recessed toward the second surface 44 with a curvature radius R1.

The second recessed surface 43c is smoothly continued to the first recessed surface 43b toward the rear edge portion 42b side and is curved toward the second surface 44 with a curvature radius R2 which is greater than that of the first recessed surface 43b.

The protrusion surface 44a of the second surface 44 extends from the front edge portion 42a toward the rear edge portion 42b side and is curved to protrude toward the side going away from the first surface 43.

According to the turbocharger 41 of the present embodiment, after the exhaust gas G passing through the upstream-side narrowed flow path F1 flows along the protrusion surface 43a, the exhaust gas flows toward the downstream side along the first recessed surface 43b and the second recessed surface 43c. At this time, first, it is possible to cause the exhaust gas G to flow while increasing an increase rate of the flow path width between the wall surface 17 and the valve body 42 due to the first recessed surface 43b having the smaller curvature radius R1.

Thereafter, it is possible to cause the exhaust gas G to flow while decreasing the increase rate of the flow path width due to the second recessed surface 43c. That is, by providing the second recessed surface 43c having a greater curvature radius R2 on the downstream side on which a boundary layer is easily generated, it is possible to effectively prevent the exhaust gas G from being separated from the first surface 43.

Figure 5:
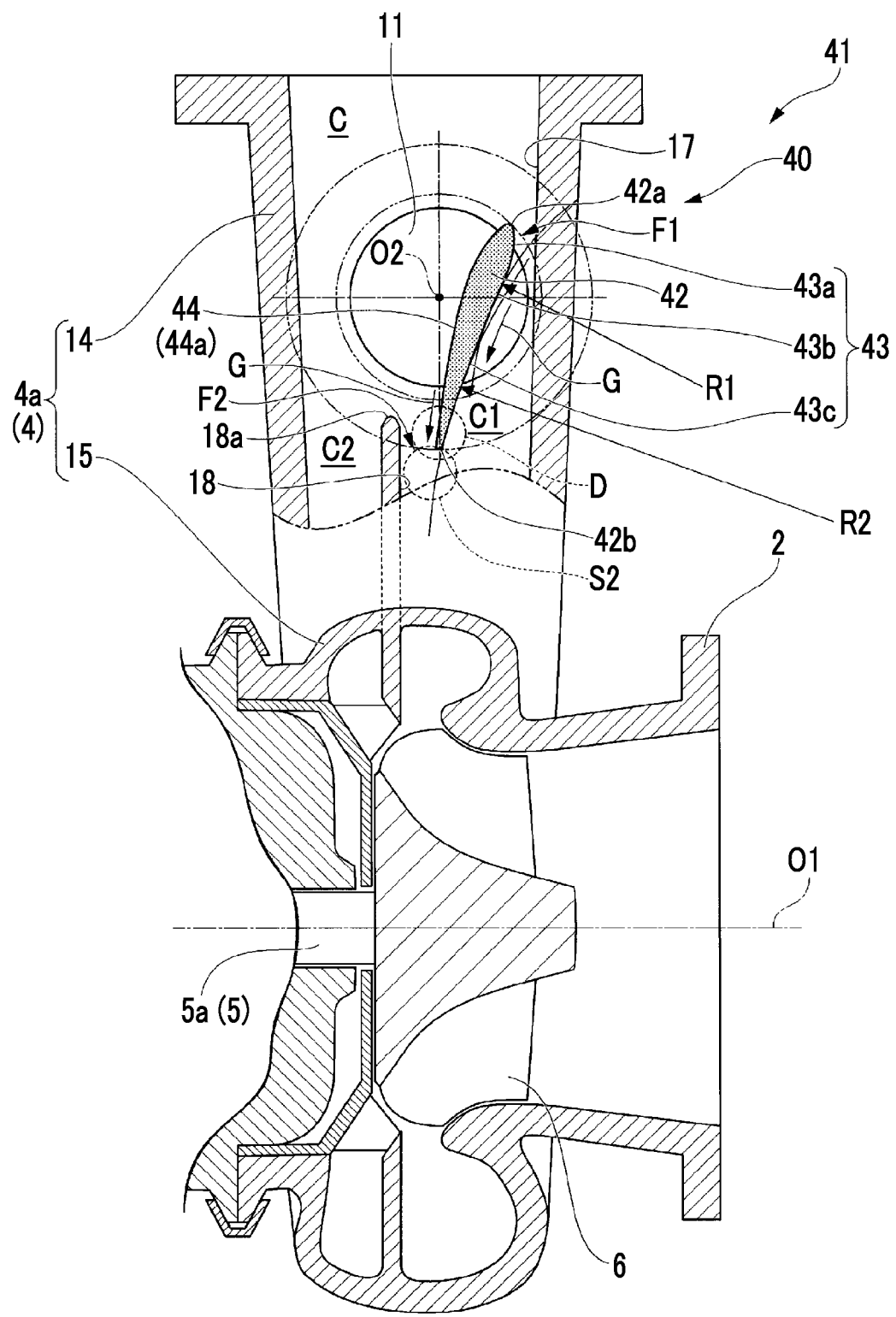
FIG. 5 is a vertical sectional view showing a main portion of a turbocharger according to a third embodiment of the present invention.

In addition, since the second surface 44 is the protrusion surface 44a, if the valve body 42 approaches the state where the valve body 42 is fully closed, after a decrease rate of the flow path width between the division wall surface 18 and the valve body 42 rapidly increases on the upstream side in the downstream-side narrowed flow path F2, the decrease rate of the flow path width gradually decreases (refer to a portion D in FIG. 5). That is, the downstream-side narrowed flow path F2 is formed in a bell mouth shape in which the flow path area increases toward the downstream side.

As a result, the exhaust gas G which flows along the protrusion surface 44a of the second surface 44 is accelerated toward the downstream side in the downstream-side narrowed flow path F2, and the static pressure around the downstream-side narrowed flow path F2 decreases. Accordingly, the exhaust gas G flowing between the wall surface 17 and the valve body 42 is accelerated toward a static pressure decrease region S2 which is formed by the downstream-side narrowed flow path F2, and it is possible to prevent the exhaust gas G from being separated from the first surface 43.

Accordingly, it is possible to decrease a pressure loss in the first flow path C1, and it is possible to prevent the entire pressure from decreasing.

In addition, the second surface 44 of the valve body 42 becomes the protrusion surface 44a, and the downstream-side narrowed flow path F2 is formed in a bell-mouth shape between the division wall surface 18 and the valve body 42. Accordingly, if the exhaust gas G flows, after the exhaust gas G is accelerated, the acceleration decreases. Accordingly, it is possible to prevent the flow of the exhaust gas G from being disturbed due to the rapid acceleration of the exhaust gas G, it is possible to prevent the flow of the exhaust gas G flowing into the second flow path C2 in the scroll flow path C from being disturbed, and it is possible to prevent occurrence of loss.

[Fourth Embodiment]

Figure 6:
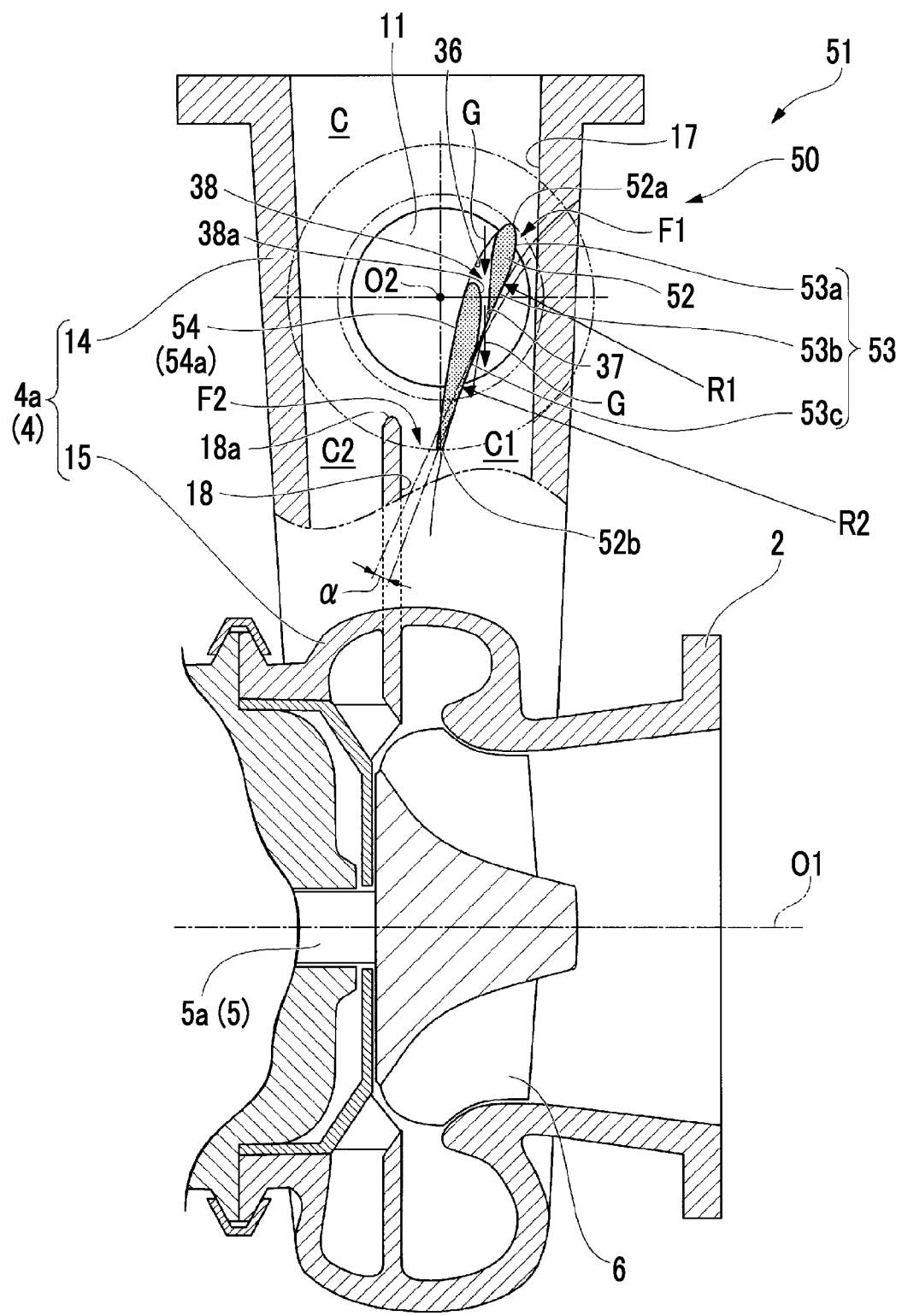
FIG. 6 is a vertical sectional view showing a main portion of a turbocharger according to a fourth embodiment of the present invention.

Next, a turbocharger 51 according to a fourth embodiment of the present invention will be described with reference to FIG. 6.

In addition, the same reference numerals are assigned to the same components similar to those of the first embodiment to the third embodiment, and detailed descriptions thereof are omitted.

In the present embodiment, a valve body 52 of an on-off valve device 50 is different from those of the first embodiment to the third embodiment.

Similarly to the valve body 42 of the third embodiment, the valve body 52 includes a protrusion surface 53a, a first recessed surface 53b, and a second recessed surface 53c as the first surface 53, and includes a protrusion surface 54a as a second surface 54. In addition, similarly to the second embodiment, the upstream-side opening 36, the downstream-side opening 37, and the through hole portion 38 are formed in the valve body 52.

In the present embodiment, the downstream-side opening 37 is formed around a boundary position between the first recessed surface 53b and the second recessed surface 53c in the first surface 53.

According to the turbocharger 51 of the present embodiment, similarly to the second embodiment, since speeds of the exhaust gas G on the downstream side of the valve body 52 are distributed so as to be uniformed, it is possible to decrease a pressure loss, and it is possible to further prevent the entire pressure from decreasing. Accordingly, it is possible to further improve the operation efficiency of the turbocharger 51.

In addition, compared to a case where the first surface 53 is linearly formed, since the first surface 53 is formed to be curved by the first recessed surface 53b and the second recessed surface 53c, it is possible to further accelerate the exhaust gas G along the first surface 53.

That is, an angle difference a between an inclination of a tangential line of the first surface 53 on the upstream side (front edge portion 52a side) of the downstream-side opening 37 and an inclination of a tangential line of the first surface 53 on the downstream side (rear edge portion 52b side) of the downstream-side opening 37 exists. Accordingly, the exhaust gas G flowing out from the downstream-side opening 37 flows so as to be pressed by the second recessed surface 53c, and it is possible to prevent separation of a boundary layer flow on the first surface 53.

[Fifth Embodiment]

Figure 7A:
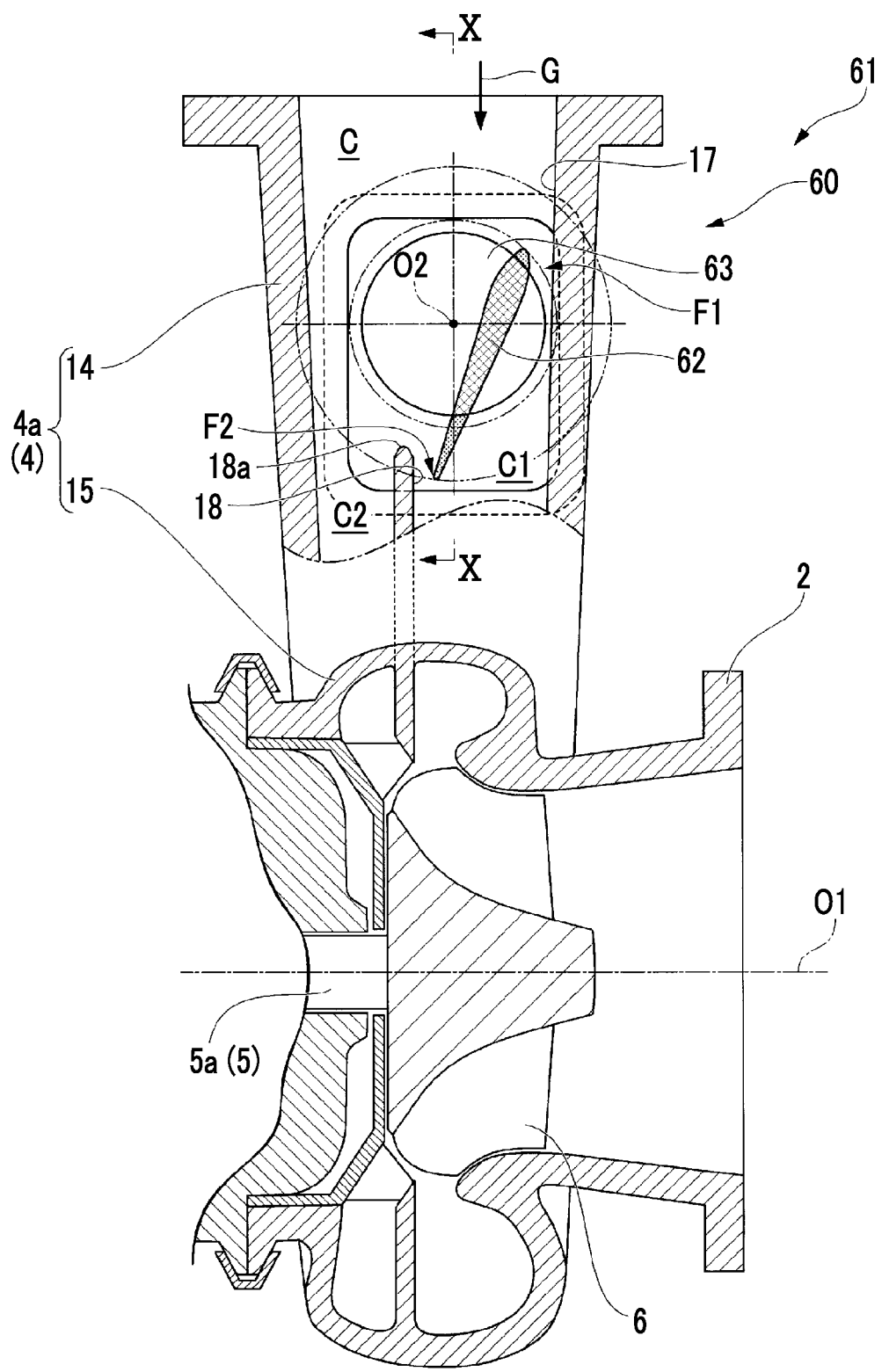
FIG. 7A is a vertical sectional view showing a main portion of a turbocharger according to a fifth embodiment of the present invention when viewed in the circumferential direction of a rotary shaft.

Next, a turbocharger 61 according to a fifth embodiment of the present invention will be described with reference to FIGS. 7A and 7B.

In addition, the same reference numerals are assigned to the same components similar to those of the first embodiment to the fourth embodiment, and detailed descriptions thereof are omitted.

In the present embodiment, the turbocharger 61 has the configuration similar to that of the first embodiment. However, a rotary portion 63 of an on-off valve device 60 which rotates a valve body 62 is different from those of the first embodiment to the fourth embodiment. The valve body 62 has the shape similar to that of the valve body 10 of the first embodiment.

The rotary portion 63 is provided to be inserted into the scroll flow path C from an opening hole 65 which is open to the inlet portion 14 of the turbine housing 4a on one side (the inner side on the paper surface of FIG. 7A in the present embodiment) in the direction of the axis which is the rotation center of the valve body 62. That is, the rotary portion 63 is separately manufactured to the turbine housing 4a and is attached to the turbine housing 4a.

Figure 7B:
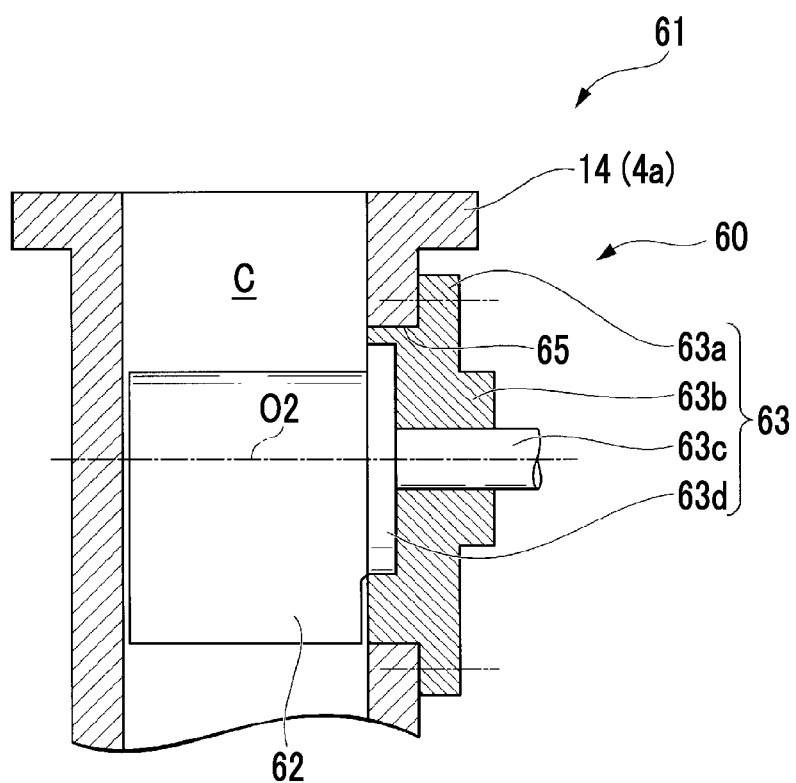
FIG. 7B is a vertical sectional view showing the main portion of the turbocharger according to the fifth embodiment of the present invention and is a sectional view taken along line X-X of FIG. 7A.

More specifically, as shown in FIG. 7B, the rotary portion 63 includes a flanged portion 63a which comes into contact with the opening hole 65 from the outside of the turbine housing 4a. Meanwhile, in a state where the flanged portion 63a comes into contact with the turbine housing 4a, the rotary portion 63 includes a rotary portion body 63b which is flush with the inner surface of the scroll flow path C.

In addition, the rotary portion 63 includes a shaft member 63c which is formed in a columnar shape with the axis O2 as a center and penetrates the rotary portion body 63b in the direction of the axis O2, and an attachment plate 63d which is interposed between the valve body 62 and the shaft member 63c and is formed in a disk shape.

The attachment plate 63d is provided to be embedded into the rotary portion body 63b, and the surface of the attachment plate 63d on the scroll flow path C side is flush with the inner surface of the scroll flow path C along with the surface of the rotary portion body 63b.

In addition, similarly to the first embodiment to the fourth embodiment, the valve body 62 is attached to the attachment plate 63d such that the rotation center of the valve body 62 is positioned outside the valve body 62.

According to the turbocharger 61 of the present embodiment, since the rotary portion 63 is separately provided, it is possible to separately process the rotary portion 63 using a process different from the process of manufacturing the turbine housing 4a. Accordingly, compared to a case where the rotary portion 63 is directly formed to the turbine housing 4a, the processing is easily performed, and it is possible to improve processing accuracy.

Accordingly, it is possible to perform accurate processing by which a clearance between the valve body 62 and the wall surface 17 and a clearance between the valve body 62 and the division wall surface 18 can be decreased as much as possible. Therefore, it is possible to prevent operation efficiency from decreasing due to a leakage flow from the clearances.

In addition, it is possible to easily improve processing accuracy of the attachment plate 63d, it is possible to improve rigidity of the attachment plate 63d, it is possible to improve durability of the attachment portion between the attachment plate 63d and the valve body 62, and reliability is improved.

Here, the rotary portion 63 of the present embodiment may be used instead of the rotary portion 11 of the first embodiment to the fourth embodiment.

[Sixth Embodiment]

Figure 8:
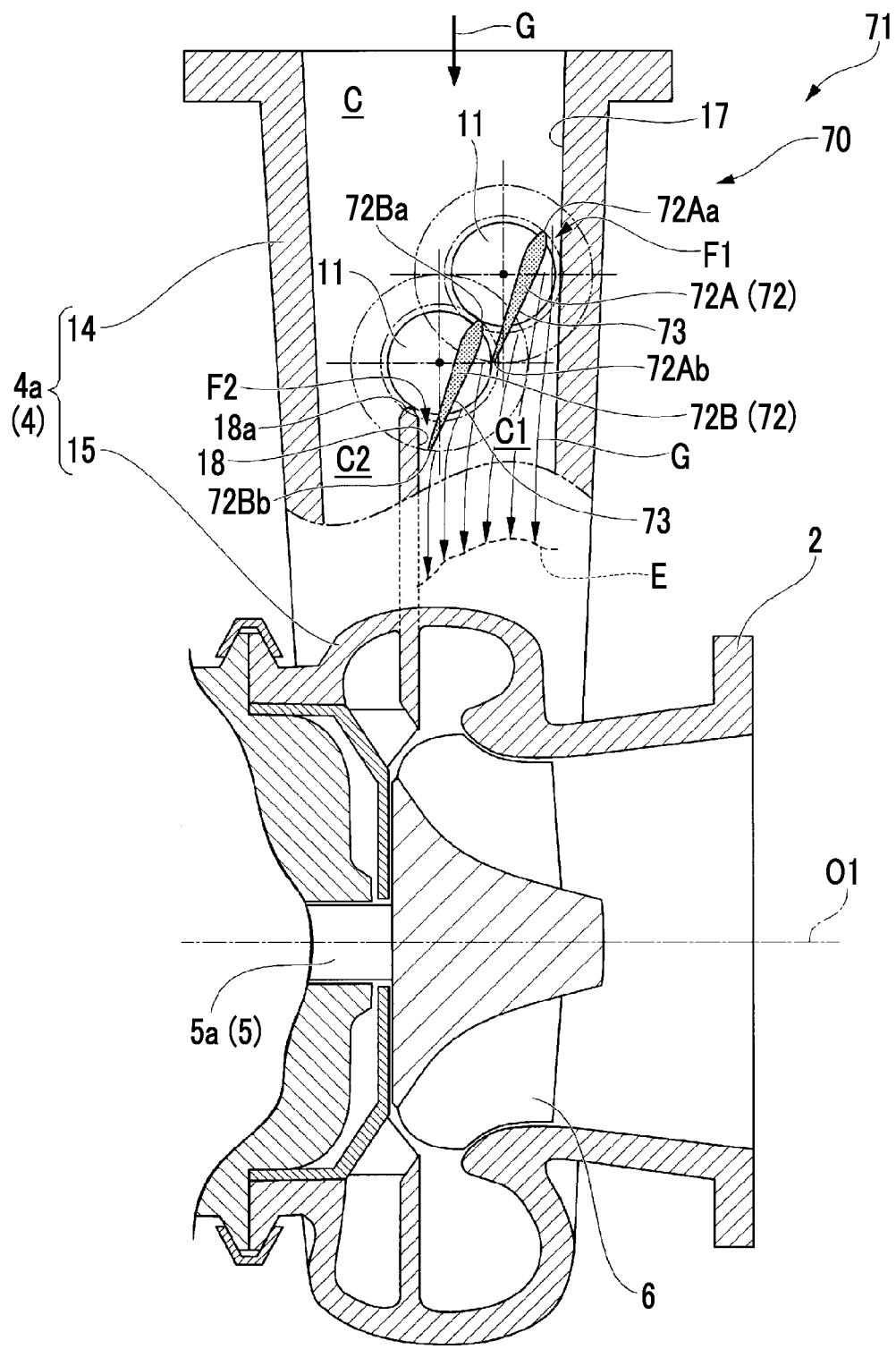
FIG. 8 is a vertical sectional view showing a main portion of a turbocharger according to a sixth embodiment of the present invention.

Next, a turbocharger 71 according to a sixth embodiment of the present invention will be described with reference to FIG. 8.

In addition, the same reference numerals are assigned to the same components similar to those of the first embodiment to the fifth embodiment, and detailed descriptions thereof are omitted.

In the present embodiment, a valve body 72 of an on-off valve device 70 is different from those of the first embodiment to the fourth embodiment.

Multiple valve bodies 72 (two in the present embodiment), in which each valve body has the shape similar to that of the valve body 10 of the first embodiment, are provided so as to be arranged in a row from the upstream side toward the downstream side. The valve bodies 72 are individually rotated by the rotary portions 11.

Here, the valve body 72 on the upstream side is referred to as a first valve body 72A and the valve body 72 on the downstream side is referred to as a second valve body 72B.

The first valve body 72A forms the upstream-side narrowed flow path F1 between the wall surface 17 of the turbine housing 4a and the first valve body 72A at the end on the upstream side (end (front edge portion 72Aa) on the outside in the radial direction)).

The second valve body 72B forms the downstream-side narrowed flow path F2 between the division wall surface 18 of the turbine housing 4a and the second valve body 72B at the end on the downstream side (the inside end (rear edge portion 72Bb) in the radial direction)).

Here, the state where the multiple valve bodies 72 are arranged in a row means a state where a front edge portion 72Ba of the second valve body 72B on the downstream side is disposed to be adjacent to a rear edge portion 72Ab of the first valve body 72A on the upstream side. In addition, the first valve body 72A on the upstream side and the second valve body 72B on the downstream side may be not completely arranged in one row, that is, for example, the valve bodies 72 may be disposed at a position slightly deviated in the direction of the axis O1 of the rotary shaft 5.

According to the turbocharger 71 of the present embodiment, since each of the first valve body 72A and the second valve body 72B is rotated, it is possible to arbitrarily change the flow path width of each of the upstream-side narrowed flow path F1 and the downstream-side narrowed flow path F2. In addition, since each of the first valve body 72A and the second valve body 72B is rotated, it is possible to cause the exhaust gas G to flow between the first valve body 72A and the second valve body 72B from the upstream side toward the downstream side.

Since the exhaust gas G flows between the valve bodies 72 and flows to first surface 73 side of each of the first valve body 72A and the second valve body 72B, a static pressure decreases at the outflow position of the exhaust gas. Accordingly, it is possible to accelerate the exhaust gas G flowing along the first surface 73 toward the downstream side. As a result, as shown by a broken line E in FIG. 8, since speeds of the exhaust gas G on the downstream side of the second valve body 72B positioned on the downstream side are distributed so as to be uniformed, it is possible to decrease a pressure loss, and it is possible to further prevent the entire pressure from decreasing.

In addition, by selecting a rotation angle of each valve body 72, the entirety of the multiple valve bodies arranged in a row has a shape protruding toward the division wall surface 18 or has a shape protruding toward the wall surface 17, and the entirety of the valve body 72 can be an arbitrary shape. Accordingly, by rotating each valve body 72 according to the situation of the flow field of the exhaust gas G, it possible to effectively prevent separation or the like.

Hereinbefore, the embodiments of the present invention are described in detail. However, various design modifications can be applied to the present invention within a scope which does not depart from the technical gist of the present invention.

Figure 9:
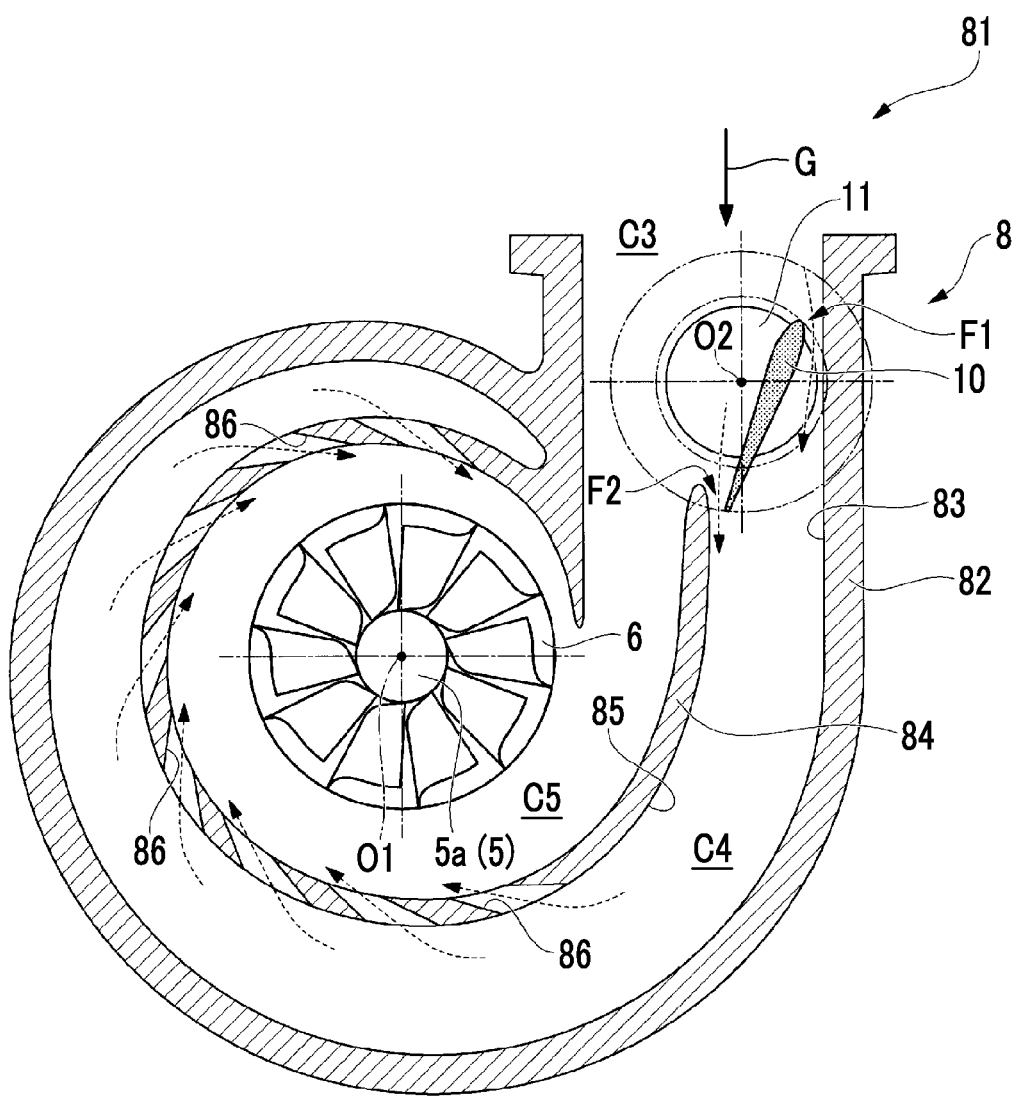
FIG. 9 is a vertical sectional view showing a main portion of a turbocharger according to a first modification example of the respective embodiments of the present invention.

For example, as shown in FIG. 9, the on-off valve device 8 (30, 40, 50, 60, 70) may be also applied to a turbocharger 81 having a structure in which a scroll flow path C3 is divided into two in the direction intersecting the axis O1.

That is, the scroll flow path C3 is configured of a first flow path C4 on the outside in the radial direction and a second flow path C5 on the inside in the radial direction which are adjacent to each other via the division wall 84 which is spirally formed with the axis O1 as a center. Multiple through holes 86 through which the exhaust gas G flows from the first flow path C4 toward the second flow path C5 are formed in the division wall 84 at intervals in the circumferential direction.

Each of the through holes 86 is largely open to the first flow path C4 side, is open to the second flow path C5 side so as to be smaller than the opening to the first flow path C4 side, and is formed to be inclined in the rotation direction of the turbine rotor blade 6 from the outside in the radial direction toward the inside in the radial direction.

The valve body 10 (32, 42, 52, 62, and 72) in the on-off valve device 8 (30, 40, 50, 60, and 70) is disposed in the first flow path C4, and is disposed between a wall surface 83 (a surface (first wall surface) facing the inside in the radial direction of the axis O1) of the housing 82 forming the first flow path C4 and a division wall surface 85 (a surface (second wall surface) facing the outside in the radial direction of the axis O1) in the division wall 84.

The valve body 10 (32, 42, 52, 62, 72) is provided in the housing 82 such that the axis O2 which is the rotating shaft of the valve body 10 is positioned along the axis O1.

In addition, in the above-described embodiment, the example in which the scroll flow path C (C3) is divided into two in the direction of the axis O1 is described. However, the prevent invention is not limited to the case where the scroll flow path C (C3) is configured to be divided into multiple paths, and the scroll flow path may be configured of a single flow path.

Figure 10:
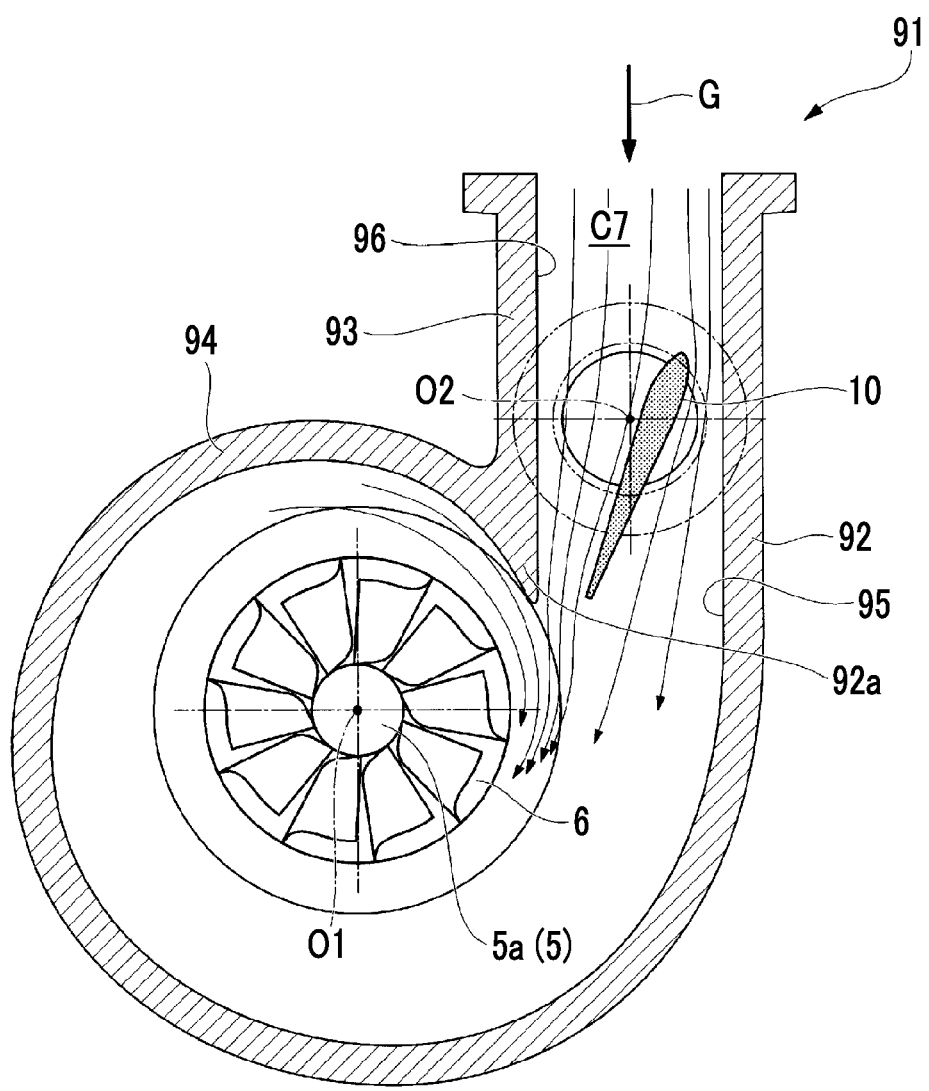
FIG. 10 is a vertical sectional view showing a main portion of a turbocharger according to a second modification example of the respective embodiments of the present invention.
Figure 11:
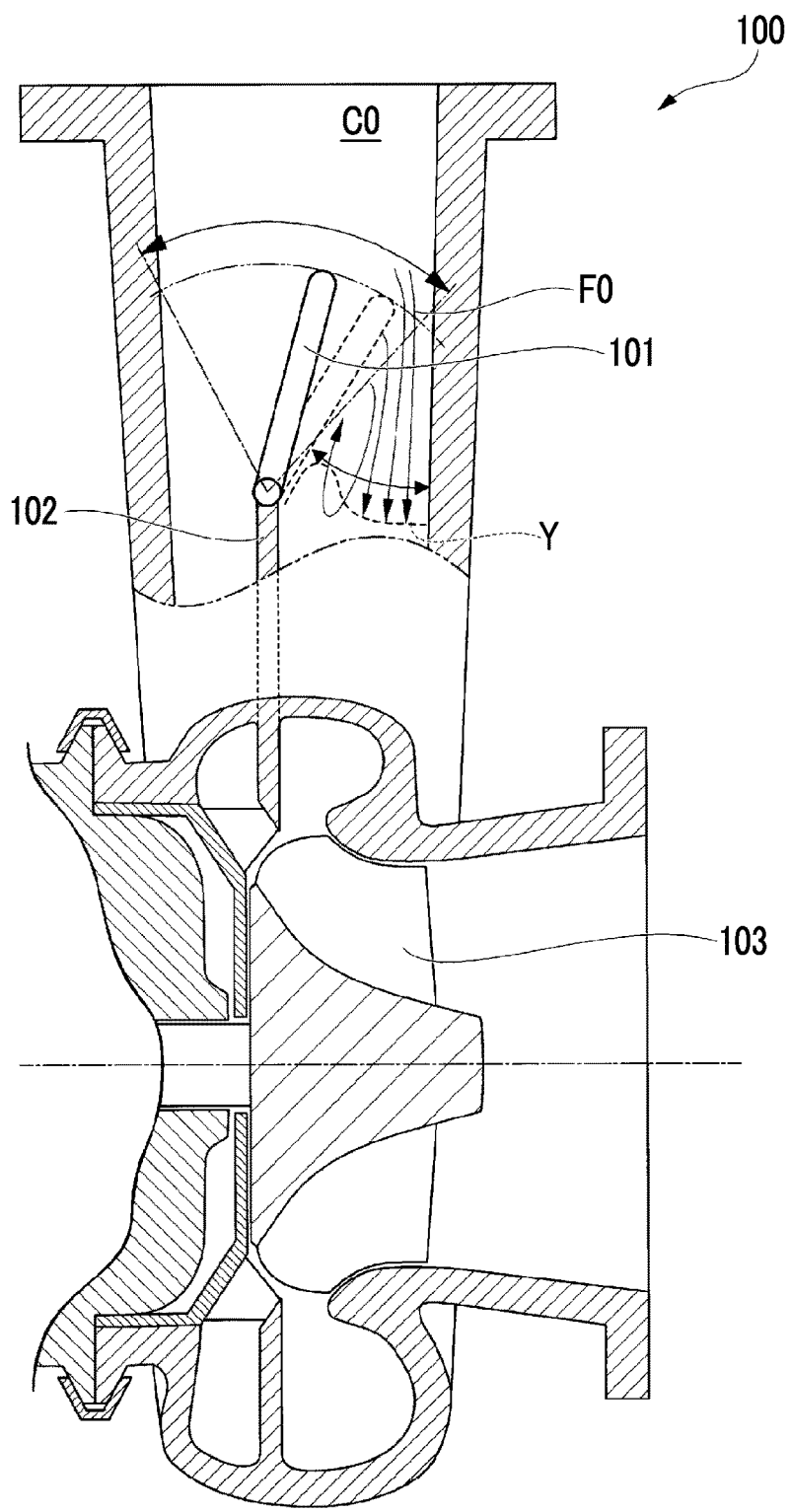
FIG. 11 is a vertical sectional view showing a main portion of a turbocharger in the related art.

Specifically, as shown in FIG. 10, in a turbocharger 91, a scroll flow path C7 which is a single flow path is formed in the housing 92.

In the example shown in FIG. 10, the scroll flow path C7 is formed inside an inlet portion 93 (inflow port) which extends and is open toward the outside in the radial direction of the axis O1 and is formed inside a scroll portion 94 which spirally extends toward the turbine rotor blade 6 in the circumferential direction to be continuous to the inlet portion 93.

In addition, the scroll flow path C7 is formed between a first wall surface 95 which is the wall surface of the housing 92 and a second wall surface 96 which faces the first wall surface 95 in the direction intersecting the axis O1.

In the housing 92 which is the connection portion between the inlet portion 93 and the scroll portion 94, a tongue portion 92*a* is formed in the scroll flow path C7 so as to extend along the circumferential direction of the axis O1. The inner surface of the tongue portion 92*a* forms the end of the second wall surface 96.

The valve body 10 (32, 42, 52, 62, 72) in the on-off valve device 8 (30, 40, 50, 60, 70) is disposed between the first wall surface 95 and the second wall surface 96 in the scroll flow path C7.

In addition, the valve body 10 (32, 42, 52, 62, 72) is provided in the housing 92 such that the axis O2 which is the rotating shaft of the valve body 10 is positioned along the axis O1.

If the valve body 10 rotates about the axis O2, the rear edge portion 10*b* of the valve body 10 approaches or go away from the tongue portion 92*a*.

The sectional shape (cross section interesting the flow of the exhaust gas G) of the scroll flow path C (C3, C7) may be various shapes such as a rectangular shape, a circular shape, or an elliptical shape. However, a rectangular shape is preferable.

In addition, the configurations of the respective embodiments may be combined.

Moreover, in the above-described embodiments, the example is described in which the on-off valve device 8 (30, 40, 50, 60, 70) is applied to the turbocharger serving as a rotary machine. However, the on-off valve device can be applied to other rotary machines such as a gas turbine or an expander.

INDUSTRIAL APPLICABILITY

According to the on-off valve device and the rotary machine, since the valve body which forms the upstream-side narrowed flow path and the downstream-side narrowed flow path and has the first surface is provided, it is possible to improve operation efficiency by a simple structure.

REFERENCE SIGNS LIST

1: turbocharger (rotary machine)
2: turbine
3: compressor
4: housing
4*a*: turbine housing
4*b*: compressor housing
5: rotary shaft
5*a*: turbine rotary shaft
5*b*: compressor rotary shaft
6: turbine rotor blade
7: bearing device
7*a*: radial bearing
7*b*: thrust bearing
8: on-off valve device
10: valve body
10*a*: front edge portion
10*b*: rear edge portion
11: rotary portion
14: inlet portion (inflow port)
15: scroll portion
17: wall surface (first wall surface)
18: division wall surface (second wall surface)
18*a*: tip portion
21: first surface
22: second surface
F1: upstream-side narrowed flow path
F2: downstream-side narrowed flow path
C: scroll flow path (suction flow path)
C1: first flow path
C2: second flow path
O1: axis
O2: axis
G: exhaust gas (fluid)
AR: air S1: static pressure decrease region
30: on-off valve device
31: turbocharger (rotary machine)
32: valve body
32a: front edge portion
32b: rear edge portion
33: first surface
34: second surface
36: upstream-side opening
37: downstream-side opening
38: through hole portion
38a: inner surface
40: on-off valve device
41: turbocharger (rotary machine)
42: valve body
42a: front edge portion
42b: rear edge portion
43: first surface
43a: protrusion surface
43b: first recessed surface
43c: second recessed surface
44: second surface
44a: protrusion surface
50: on-off valve device
51: turbocharger (rotary machine)
52: valve body
52a: front edge portion
52b: rear edge portion
53: first surface
53a: protrusion surface
53b: first recessed surface
53c: second recessed surface
54: second surface
54a: protrusion surface
60: on-off valve device
61: turbocharger (rotary machine)
62: valve body
63: rotary portion
65: opening hole
63a: flanged portion
63b: rotary portion body
63c: shaft member
63d: attachment plate
70: on-off valve device
71: turbocharger (rotary machine)
72: valve body
72A: first valve body
72B: second valve body
72Aa: front edge portion
72Ab: rear edge portion
72Ba: front edge portion
72Bb: rear edge portion
73: first surface
81: turbocharger (rotary machine)
82: housing
83: wall surface (first wall surface)
84: division wall
85: division wall surface (second wall surface)
86: through hole
C3: scroll flow path (suction flow path)
C4: first flow path
C5: second flow path
91: turbocharger
92: housing
92a: tongue portion
93: inlet portion
94: scroll portion
95: first wall surface
96: second wall surface
C7: scroll flow path (suction flow path)
100: turbine
101: on-off valve
102: division wall
103: turbine rotor blade
F0: working fluid
C0: scroll flow path

The invention claimed is:

1. An on-off valve device comprising a valve body which is disposed in a suction flow path which leads from an inflow port of a housing covering a turbine rotor blade to a scroll portion and is configured of a single piece or multiple divided pieces to supply a fluid to the turbine rotor blade with an inner surface of the suction flow path formed using a first wall surface and a second wall surface facing the first wall surface as a portion of the suction flow path, extends from the upstream side toward the downstream side of the flow of the fluid, is rotatably provided in the housing in a direction toward and away from the first wall surface and the second wall surface, forms an upstream-side narrowed flow path between the first wall surface and the valve body at an end on the upstream side, and forms a downstream-side narrowed flow path between the second wall surface and the valve body at an end on the downstream side; and a rotary portion configured to rotate the valve body about an axis which is a rotation center of the valve body, wherein in the rotary portion, the axis is positioned outside the valve body, wherein in the valve body, the end on the upstream side is an end facing the first wall surface, and the end on the upstream side is formed of a first surface which gradually goes away from the first wall surface after gradually approaches the first wall surface from the upstream side toward the downstream side, and wherein the valve body includes a second surface which faces the second wall surface at the end on the downstream side, wherein the valve body is fully opened when the first surface is parallel to the first wall surface, the valve body is fully closed when the leading edge of the valve body comes into contact with the first wall surface along with the trailing edge comes into contact with the second wall surface, the opening degree of the valve body is indicated as an inclination angle of the trailing edge of the valve body in a direction from the first wall surface to the second wall surface, in an intermediate opening degree of the valve body between a fully close condition and a fully open condition of the valve body, the leading edge of the valve body approaches the first wall surface and the trailing edge approaches the second wall surface.

2. The on-off valve device according to claim 1, wherein an upstream-side opening which is open to the second surface, a downstream-side opening which is open to the first surface on the downstream side of the upstream-side opening, and a through hole portion which connects the upstream-side opening and the downstream-side opening to each other and penetrates a portion between the first surface and the second surface are formed in the valve body.

3. The on-off valve device according to claim 1, wherein the valve body includes a protrusion surface which gradually approaches the first wall surface toward the downstream side, a first recessed surface which is continued to the downstream side of the protrusion surface and is curved to be recessed toward the second surface, and a second recessed surface which is continued to the downstream side of the first recessed surface and is curved to be recessed toward the second surface with a curvature radius which is greater than that of the first recessed surface, as the first surface, and includes a protrusion surface which is cured to protrude toward the side going away from the first surface, as the second surface.

4. The on-off valve device according to claim 1, wherein a rotary portion which rotates the valve body is separately provided from the housing.

5. The on-off valve device according to claim 1, wherein multiple valve bodies are provided to be arranged in a row from the upstream side toward the downstream side, and
wherein rotary portions which individually rotate the valve bodies are provided.

6. A rotary machine, comprising:
a rotary shaft which rotates about an axis;
a turbine rotor blade which rotates along with the rotary shaft;
a housing which covers the rotary shaft and the turbine rotor blade and in which a suction flow path through which a fluid is supplied to the turbine rotor blade is formed; and
the on-off valve device according to claim 1 in which the valve body is provided in the suction flow path of the housing.

7. The rotary machine according to claim 6, wherein in the housing, the second wall surface is formed of a division wall surface which divides the scroll portion into two paths in the direction intersecting the flow direction of the fluid.

8. The on-off valve device according to claim 2, wherein the valve body includes a protrusion surface which gradually approaches the first wall surface toward the downstream side, a first recessed surface which is continued to the downstream side of the protrusion surface and is curved to be recessed toward the second surface, and a second recessed surface which is continued to the downstream side of the first recessed surface and is curved to be recessed toward the second surface with a curvature radius which is greater than that of the first recessed surface, as the first surface, and includes a protrusion surface which is cured to protrude toward the side going away from the first surface, as the second surface.

9. The on-off valve device according to claim 2, wherein a rotary portion which rotates the valve body is separately provided from the housing.

10. The on-off valve device according to claim 3, wherein a rotary portion which rotates the valve body is separately provided from the housing.

11. The on-off valve device according to claim 2, wherein multiple valve bodies are provided to be arranged in a row from the upstream side toward the downstream side, and
wherein rotary portions which individually rotate the valve bodies are provided.

12. The on-off valve device according to claim 3, wherein multiple valve bodies are provided to be arranged in a row from the upstream side toward the downstream side, and
wherein rotary portions which individually rotate the valve bodies are provided.

13. The on-off valve device according to claim 4, wherein multiple valve bodies are provided to be arranged in a row from the upstream side toward the downstream side, and
wherein rotary portions which individually rotate the valve bodies are provided.

14. A rotary machine, comprising:
a rotary shaft which rotates about an axis;
a turbine rotor blade which rotates along with the rotary shaft;
a housing which covers the rotary shaft and the turbine rotor blade and in which a suction flow path through which a fluid is supplied to the turbine rotor blade is formed; and
the on-off valve device according to claim 2 in which the valve body is provided in the suction flow path of the housing.

15. A rotary machine, comprising:
a rotary shaft which rotates about an axis;
a turbine rotor blade which rotates along with the rotary shaft;
a housing which covers the rotary shaft and the turbine rotor blade and in which a suction flow path through which a fluid is supplied to the turbine rotor blade is formed; and
the on-off valve device according to claim 3 in which the valve body is provided in the suction flow path of the housing.

16. A rotary machine, comprising:
a rotary shaft which rotates about an axis;
a turbine rotor blade which rotates along with the rotary shaft;
a housing which covers the rotary shaft and the turbine rotor blade and in which a suction flow path through which a fluid is supplied to the turbine rotor blade is formed; and
the on-off valve device according to claim 4 in which the valve body is provided in the suction flow path of the housing.

17. A rotary machine, comprising:
a rotary shaft which rotates about an axis;
a turbine rotor blade which rotates along with the rotary shaft;
a housing which covers the rotary shaft and the turbine rotor blade and in which a suction flow path through which a fluid is supplied to the turbine rotor blade is formed; and
the on-off valve device according to claim 5 in which the valve body is provided in the suction flow path of the housing.

18. The on-off valve device according to claim 1, wherein the opening degree of the valve body is within a range from 15° to 45°.

* * * * *